United States Patent [19]

Fox

[11] Patent Number: 4,585,030
[45] Date of Patent: Apr. 29, 1986

[54] PROPORTIONAL HYDRAULIC SOLENOID CONTROLLER

[75] Inventor: Clarence D. Fox, Decatur, Ill.

[73] Assignee: Borg-Warner Corporation, Chicago, Ill.

[21] Appl. No.: 597,303

[22] Filed: Apr. 6, 1984

[51] Int. Cl.$^4$ ............................................. F15B 13/043
[52] U.S. Cl. .................................. 137/625.64; 91/433; 137/625.61
[58] Field of Search ................... 91/433; 137/625.61, 137/625.64

[56] References Cited

U.S. PATENT DOCUMENTS

| | | | |
|---|---|---|---|
| 2,629,365 | 2/1953 | Kennedy | 91/433 X |
| 2,832,318 | 4/1958 | Paine | 137/85 X |
| 2,880,708 | 4/1959 | Hayner | 91/433 X |
| 3,519,022 | 7/1970 | Chung et al. | 137/625.64 |
| 3,678,952 | 7/1972 | Nishimura | 137/53 |
| 3,692,137 | 9/1972 | Inoue | 137/625.61 X |
| 3,696,839 | 10/1972 | Irie | 137/625.61 |
| 3,727,487 | 4/1973 | Forster et al. | 137/625.64 X |
| 3,856,047 | 12/1974 | Takayama | 137/625.61 |
| 3,865,140 | 2/1975 | Greenwood | 137/625.64 |
| 3,918,488 | 11/1975 | Minami | 137/625.64 X |
| 3,977,382 | 8/1976 | Tuzson et al. | 123/139 AW |
| 4,052,930 | 10/1977 | Hiramatsu et al. | 137/625.64 X |
| 4,436,489 | 3/1984 | Zangenberg | 417/218 |

FOREIGN PATENT DOCUMENTS

| | | | |
|---|---|---|---|
| 167905 | 12/1981 | Japan | 137/628.61 |
| 1228782 | 4/1971 | United Kingdom | 137/625.64 |
| 2101772 | 1/1983 | United Kingdom | 137/625.64 |

OTHER PUBLICATIONS

"Hydraulic Control Systems"—Herbert E. Merritt, John Wiley and Sons, 1967, pp. 331 and 332.
Illustration of an Electronic Transmission Control System from Robert Bosch Co.—Source Unknown.

Primary Examiner—Gerald A. Michalsky
Attorney, Agent, or Firm—Florian S. Gregorczyk

[57] ABSTRACT

A control valve assembly is disclosed for control of a fluid pressure between a variable fluid pressure source and a fluid operable device. This assembly provides a valve means to open or close flow from the fluid pressure source in response to a change in a significantly lower fluid pressure in a pilot chamber, which fluid pressure is controlled by a proportional solenoid operator requiring small current flow. This small current flow to the solenoid operator is due to the low pressure in the pilot chamber, which when relieved or increased effects a change in the valve meaans to open or close fluid flow to or from the fluid pressure source.

7 Claims, 4 Drawing Figures

PROPORTIONAL HYDRAULIC SOLENOID CONTROLLER

BACKGROUND OF THE INVENTION

1. Field

The present invention relates to a hydraulic pressure fluid regulator and more particularly to a regulator for use in providing a controlled pressure level to a fluid pressure actuated device.

2. Prior Art

The prior art includes various controllers dealing particularly with fuel regulator systems and spool valve type devices.

Included in the prior art is a fuel regulator cooperating with a charge forming apparatus as shown in U.S. Pat. No. 3,977,388 of a type in which excess fuel is recirculated from the charge forming apparatus and maintains a stable pressure and air fuel ratio. Another embodiment teaches an electronically controlled transducer for varying air pressure in air fuel ratios, which transducer utilizes a solenoid operator to control flow to a reference pressure chamber. The use of spool valves is known throughout the valve art. This is illustrated in "Hydraulic Control Systems", H. E. Merritt, John Wiley and Sons 1967, page 331 and 332 where a pressure control valve system is shown for pressure relief. Specifically this illustration shows the use of an orifice and a spring loaded pilot valve to relieve pressure in a chamber.

U.S. Pat. No. 4,436,489 (Zangenberg) discloses a valve means with a bore therein for use in a control device for a liquid pump. However, this device regulates the pump not the flow therefrom which flow passes directly to a fluid motor.

A pressure fluid circuit for an automatic transmission is taught in U.S. Pat. No. 3,678,952 (Nishimura). This patent teaches a line pressure circuit monitoring pump discharge pressure which is controlled by a valve connected to a governor circuit having a leak valve operable by centrifugal force corresponding to transmission shaft output speed. The valve provides flow resistance as a function of pressure in the governor circuit to sustain a minimum pressure required for transmission clutch operation.

A means for controlling hydraulic pressure in an automobile pressure application is known in the art as a proportional solenoid (VFS to regulate pressure to clutches). This device utilizes an electromagnetically movable armature in contact with a spool valve. The armature controls the position of the spool valve to thereby open fluid flow to an operating mechanism at the output pressure. This particular device is accurate, but requires extreme care in manufacture due to the close tolerances associated with the position of such armature and spool valve, and it utilizes up to 1.0 amperes current to control the operation of the spool valve.

SUMMARY OF THE INVENTION

The present invention is directed to an improvement in the use of a solenoid fluid pressure device for a fluid operable mechanism connected to a fluid source with varying output pressure. In control circuits for hydraulic fluids it is desirable to reduce the flow from a fluid pressure source when a device or devices driven by such fluid pressure are not in use. A device or controller is required to provide fluid at a pressure upon demand while minimizing, reducing or completely stopping flow from the source to the operable device. Such controllers must be responsive to changing conditions or demand and to variations in flow and pressure.

In an automobile hydraulic fluids drive devices such as continuously variable transmissions, that is, transmissions using belt means and movable sheave type pulleys to vary the transmission ratios, and fluid actuatable clutches. These devices require fluids, generally liquids or oils, at elevated pressures, that is, in the range of 100 pounds per square inch, to operate such devices. It is also desirable to minimize flow from the fluid pressure source, generally a pump, when such pressure is not required.

Therefore, a control device which can maintain accurate or relatively accurate control of high pressures while simultaneously being operable with relative low pressures has been developed. In addition, this controller would not require a high degree of manufacturing precision, and would be operable over a wide pressure range.

The present invention provides a means to cotnrol the pressure from a fluid source, such as a pump, which may operate at relatively high pressures (e.g., 300 psi). This controller is capable of controlling the fluid pressure to a predetermined level up to the maximum source pressure and thereafter shunting the flow to a sump, or stopping flow from the source altogether. Flow to a fluid-operable mechanism is provided past a spool valve to the fluid-operable mechanism. Simultaneously fluid is bypassed to both an intermediate or first chamber and a third chamber wherein the fluid operates to bias the spool valve against a bias means, such as a spring, to move the spool valve to open a sump port and bypass excess flow and pressure. The fluid flow provided to the first chamber flows past a restriction or orifice to reduce the pressure and flow rate to a second chamber, which serves as a pilot chamber. Fluid flow into this pilot chamber is unfettered in a reference condition, and returns to sump through a control port. However, as the spool valve moves to open the sump port and to restrict flow from the fluid source, a proportional solenoid operator, which is responsive to a control signal, mounted at the control port closes the control port and traps fluid in the pilot chamber. This fluid is at a greatly reduced pressure from that delivered from the fluid pressure source. As there is only a nominal pressure in this chamber it only requires a relatively small solenoid operator to control fluid flow past the control port to thus control the spool valve. Therefore, only a small current flow (in the milliamp range) is required to operate the armature of such a solenoid. In an automotive application this controller is a highly desirable apparatus as it minimizes demand upon the electrical circuit, while maintaining fluid control between a high-pressure source (e.g., operating up to 300 psig) and a fluid-operable device high requiring pressures (e.g., 100 psig.) Also, flow from the high-pressure source is inhibited when not required, which reduces the mechanical power load on a drive means, such as an automobile engine.

Although the regulator of the present invention is particularly useful or may find use in many pressure applications or regulations systems, it would be especially beneficial in automobile applications in regulating varying pressure ranges from a pump upon demand, but inhibiting or short circuiting such fluid flows from the pump to minimize power requirements from the engine to reduce fuel requirements.

BRIEF DESCRIPTION OF THE DRAWING

In the figures of the drawing, like reference characters identify like components and in that drawing.

DESCRIPTION OF THE PREFERRED EMBODIMENTS

Figure 1:
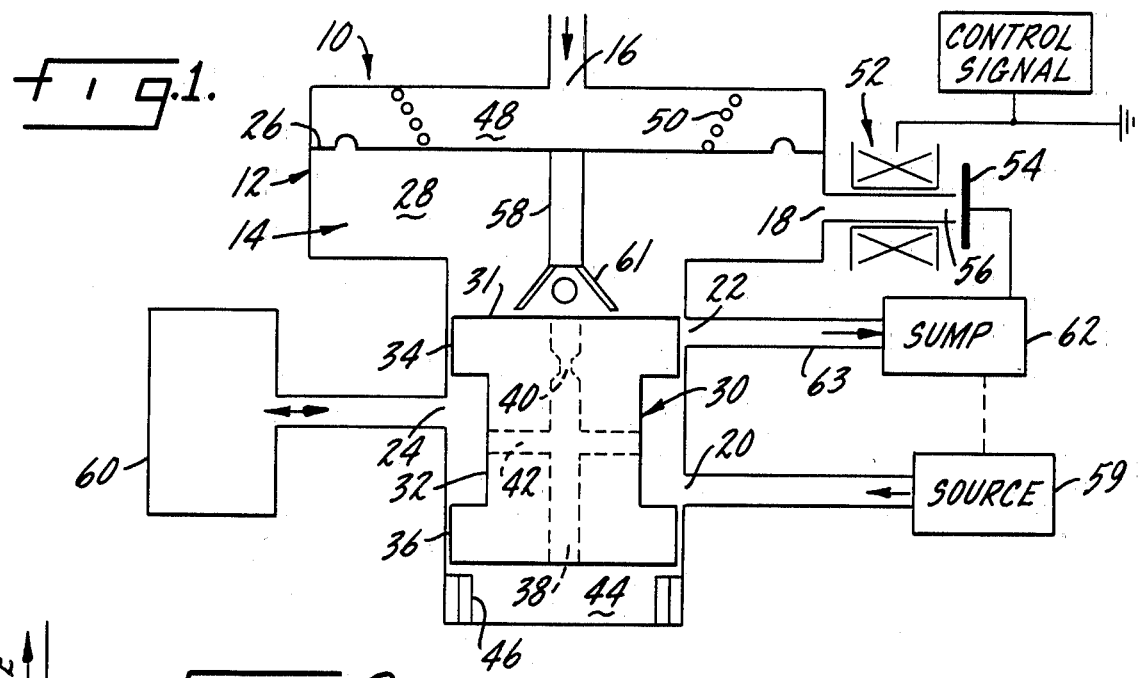
FIG. 1 shows a schematic drawing illustrating a preferred embodiment of the regulator system operable between a fluid pressure source and regulated fluid pressure operable device.

Referring now in more detail to the drawings and particularly to FIG. 1, there is shown a normally-open, proportional, fluid-pressure, control valve assembly 10 including a housing 12 defining a cavity 14. Housing 12 defines a reference fluid pressure port 16, a fluid control port 18, a fluid source port 20, a sump port 22, and a servo mechanism port 24.

A diaphragm operator 26 having a predetermined surface area is positioned in cavity 14 and cooperates with housing 12 to define a first chamber 28 and a second or reference chamber 48, which first chamber 28 will be utilized as an intermediate-fluid or pilot chamber.

A valve means 30 illustrated as a spool valve, with an exposed surface 31 having a predetermined surface area, has or defines a groove 32 and lands 34 36. Spool valve 30 further defines a longitudinal or first passage 38 having an orifice 40 therein, and a cross passage or second passage 42 intersecting first passage 38 and providing fluid communication through or across groove 32. Valve means 30 cooperates with housing 14 to define a third chamber 44 to provide fluid-retention volume, which fluid is transferred through passage 38 to chamber 44. Mounted in chamber 44 are positive stops 46 to limit or minimize the lower travel of valve means 30. Such stops 46 are optional and are not requisite to the operation of such valve assembly 10.

Reference fluid pressure port 16 provides communication between a reference fluid source and second chamber 48. Such reference fluid source is illustrated as atmosphere in FIG. 1. Positioned in chamber 48 between diaphragm operator 26 and housing 12 is a biasing means 50, shown as a variable rate spring.

Connected at fluid control port 18 is a proportional solenoid operator 52 with an armature 54, which solenoid defines a fluid passage 56 therethrough. Fluid control port 18 provides communication to a sump 62 thrugh fluid passage 56 of solenoid operator 52 and first chamber 28 of housing 12. Positioned in housing 12 and mounted for operation by diaphragm operator 26 is an extending arm 58. Arm 58 includes legs or a contact means 61 to contact exposed surface area 31 of valve means 30 and provide a mechanical contact to move such valve means 30 under the bias force of biasing means 50. Spring 50 may be chosen with a force operable on valve means 30 adequate to provide a resistance to movement equivalent to a maximum desired fluid pressure in third chamber 44 against which such bias will retain or maintain valve means 30 in its reference position. The reference position is that position at which solenoid operator 52 is in its open position, and the fluid from a fluid pressure source 59, such as a varying or variable pump or pressure source 59, is communicated through fluid source port 20, past groove 32 of valve means 30, servo mechanism port 24, to a fluid pressure operable device or servo mechanism 60. Sump 62 for fluid pressure source 59 has a return conduit 63 for fluid from cavity 14.

Empirical test results have been obtained for the operation of this invention. When fluid at an elevated pressure from a fluid source 59 is provided to a spool valve means 30 as illustrated in FIG. 1, such fluid communicates past groove 32 to a fluid pressure operable device 60, and further is communicated through passages 42 and 38 of valve means 30 to chamber 44. It is desirable to operate the fluid operable device 60 only up to a predetermined or maximum pressure, generally below the pressure of fluid pressure source 59. Therefore, it is necessary to control the fluid operating pressure, and further it is desirable to minimize flow from fluid pressure source 59 when the fluid pressure operable device 60 is not operating. On this basis and with the assembly shown, fluid communicates to chamber 44 until such time as the fluid pressure therein is above that pressure required to move valve means 30 against bias means 50, which is maintaining arm 58 and contact means 61 in contact with valve 30 to keep it in its reference position. As the pressure in chamber 44 increases to the level required to overcome the bias force of bias means 50 it will move valve means 30 and position land 36 to seal fluid communication from fluid pressure source 59, and also open fluid communication to sump 62 through sump port 22. In addition, fluid will have been flowing through passage 38 past orifice 40 into chamber 28. However, as orifice 40 represents a restriction to flow, there will be a pressure change and fluid flow will be nominal. When solenoid operator 52 is energized to pull armature 54 to seal passage 56, fluid flow from chamber 28 through passage 56 to sump 62 will be closed. As fluid continues to flow to chamber 28 with solenoid operator 52 closed, a fluid pressure will develop in chamber 28 until fluid pressure in third chamber 44 is adequate to move valve means 30 to open sump port 22. It has been found that the pressure in fluid operable device 60 may be maintained at or about the same pressure as that in chamber 28 if valve means 30 is not moved to open source port 20. The pressure in pilot chamber 28 may be in the range of zero to five psig., which implies relatively minimal force will be required to maintain armature 54 in position to seal passage 56 of solenoid operator 52, and thus to seal control port 18. Thus, regulation of valve means 30 will be maintained in relatively close control, that is, if an overpressure condition were experienced in fluid operable device 60 valve means 30 would move to open fluid communication to sump 62, and/or further fluid communication to sump 62 would be provided past orifice 40 and through control port 18. Should the pressure in third chamber 4 and thus fluid operable device 60 fall below that pressure which is required to overcome bias means 50, valve means 30 would be moved to open source port 20 and close sump port 22. Thus fluid pressure will again communicate past groove 32 to fluid pressure operable device 60.

Figure 2:
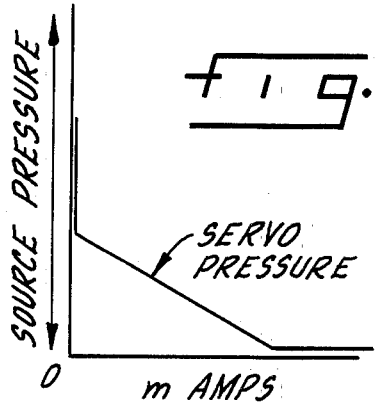
FIG. 2 is a graphical illustration of the variation of the source pressure as an inverse function of the current applied to the proportional solenoid.

Control of the fluid pressure in chamber 44 is maintained by operation of solenoid operator 52. As fluid may freely flow past control port 18 as long as passage 56 of solenoid operator 52 is open. As fluid pressure is allowed to increase or decrease in pilot chamber 28 by control of flow through passage 56, control of the pressure in chamber 44 and fluid operable device 60 is also controlled. Therefore, after attainment in chamber 44 of that pressure required to move valve means 30 to seal source port 20, valve means 30 may dither or oscillate to open and close sump port 20 in response to small pressure changes in either pressure operable device 60 or in pilot chamber 28. This requires only a minimal current flow to solenoid operator 52. This effect is illustrated in FIG. 2 where the source pressure is illustrated as a decreasing pressure as a function of increasing current (in milliamps) to solenoid operator 52. The position or time at which solenoid operator 52 is actuated is a function of a control signal provided by a controller (not shown) to provide current flow to the solenoid operator. Solenoid operators, known in the prior art, include magnetic windings to provide a current flow and a magnetic field. This magnetic field will attract armature 54 and seal flow through passage 56.

Figure 3:
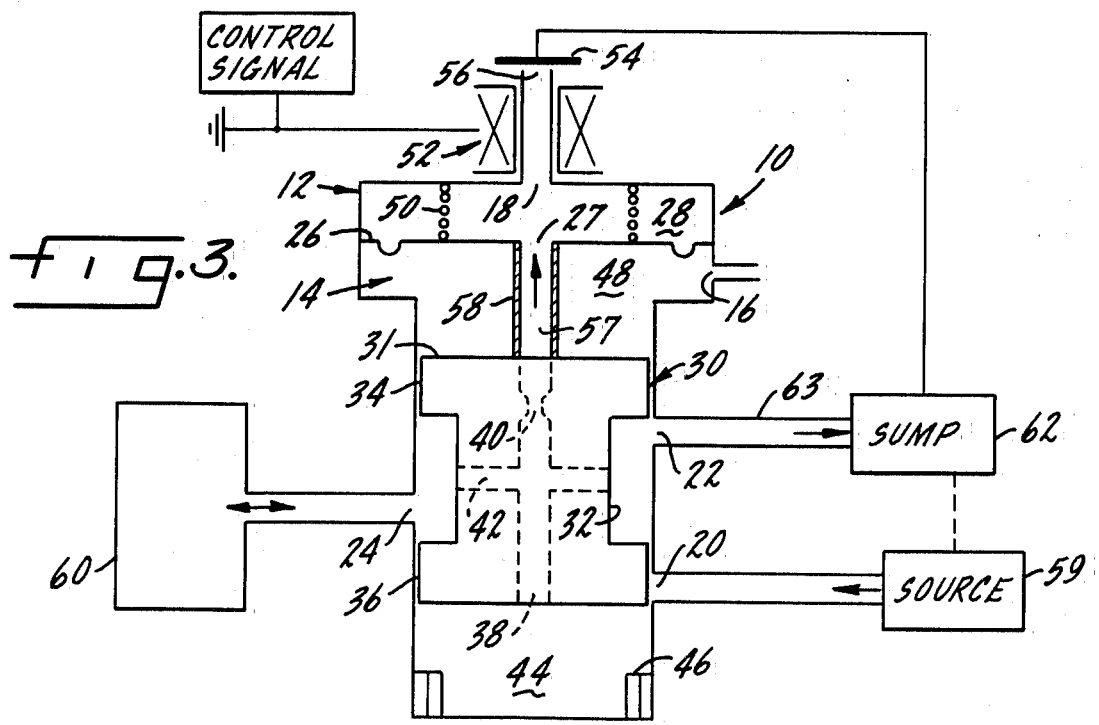
FIG. 3 is an alternative embodiment of the fluid pressure regulator illustrated in FIG. 1; and, FIG. 4 is a graphical illustration of the variation of source pressure as directly proportional to the current applied to the proportional solenoid for the alternative embodiment.

An alternative embodiment of the valve control assembly 10 is shown in FIG. 3, wherein diaphragm 26 defines a through-hole 27 in alignment with passage 38. Arm 58 defines a through-bore 57 and is joined to both valve means 30 and diaphragm operator 26. In this configuration reference pressure chamber 48 is defined by valve means 30, housing 12 and diaphragm operator 26 and control chamber 28 is defined between housing 12 and diaphragm operator 26. Bias means 50 is positioned in chamber 28 and is operable in the same manner as the embodiment above. In this alternative embodiment bore 57 of arm 58 provides communication between control chamber 28 and passage 38 of valve means 30, while sealing fluid communication to chamber 48 (except for leakage).

Figure 4:
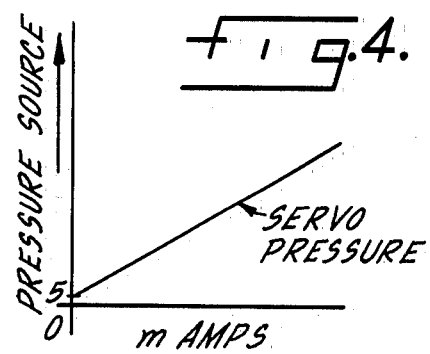

This alternate embodiment provides an increasing pressure from the source as a function of the milliamps to the solenoid operator as illustrated in FIG. 4. That is, the intercept on the pressure source (vertical) axis of FIG. 4 is the minimum pressure in chamber 28 when there is no current to the solenoid operator 52 to close passage 56. In this mode bias means 50 moves valve means 30 to open source port 20 and permit fluid flow past groove 32 to servo port 24 and fluid operated device 60. As fluid flow from fluid pressure source 59 continues to servo mechanism 60 it is also introduced to chamber 44 through cross passage 42 and passage 38. Orifice 40 in passage 38 presents a restriction to flow toward chamber 28 until sufficient pressure is provided to chamber 44. As pressure increases in chamber 44 it moves valve means 30 until sump port 22 is open. Also, a reduced pressure is developed in chamber 28 and this pressure is controlled by the amount of current provided to solenoid operator 52. As current is reduced the pressure in chamber 28 and thus chamber 44 is reduced and valve means 30 moves to open the source port 20 until adequate pressure is again developed in chamber 44 to close source port 20 and open sump port 22. Therefore, valve means 30 will move to retain pressure in servo mechanism 60 as a function of the pressure in chamber 28 which pressure is controlled by the current flow to solenoid operator 52 and is correlative to the pressure in chamber 44 to provide control of the pressure to the fluid pressure operable device 60.

It is apparent that within the scope of the invention, modifications of the described embodiments and different arrangements may be made. The present disclosure is illustrative merely, the invention comprehending all variation thereof.

What is claimed is:

1. A proportional, fluid-pressure control valve assembly for control of fluid pressure between a variable fluid pressure source and a sump through a fluid return conduit, which controlled fluid pressure is bounded by a predetermined lower limit and the maximum pressure of said variable fluid pressure source, and which controlled pressure is applied to a regulated, fluid-pressure operable device, said valve assembly comprising:

a housing defining a cavity having a diaphragm operator with a predetermined surface area positioned in said cavity and cooperating with said housing to define a first chamber and a second chamber, said housing further defining a fluid control port communicating between said first chamber and said sump and a reference fluid pressure port communicating between said second chamber and a fluid source at a reference pressure;

said housing defining a fluid source port communicating between said cavity and said variable fluid pressure source, and a servo mechanism port communicating between said cavity and said fluid-pressure operable device;

said housing defining a sump port communicating between said cavity and said sump return conduit;

valve means with an exposed surface of a predetermined surface area positioned in said cavity and operable to provide fluid at a regulated pressure at said servo mechanism port by regulating communication between said servo mechanism port and one of said fluid source port and said sump port, said valve means cooperating with said housing to define a third chamber for a fluid at said controlled pressure;

an arm extending from said diaphragm operator to contact said valve means exposed surface;

biasing means provided between said housing and said diaphragm operator, which biasing means is operable to maintain said valve means open at a reference position to provide fluid communication between said variable fluid pressure source and said fluid-pressure operable device;

said valve means defining a first passage with an orifice therein, which first passage communicates through said valve means between said third chamber and said first chamber;

said valve means further defining a second passage to communicate between said cavity and said first passage to provide fluid at a regulated pressure to said first and third chambers;

a proportional solenoid operator connected between said fluid control port and said sump to regulate fluid communication between said sump and fluid control port;

wherein said diaphragm operator mechanically acts to move said valve means as a function of the ratio of the diaphragm surface area to said valve means surface area and the fluid pressure in said third chamber such that the fluid pressure in said first chamber communicating with the fluid control port is controllable by said solenoid operator to thus provide fluid pressure to said fluid-pressure operable device at any pressure level between said predetermined lower limit and said maximum pressure as a function of electrical current input to said solenoid operator, and to block fluid flow from the pressure source through said fluid source port.

2. A control valve assembly as claimed in claim 1 wherein said first chamber is oriented in said housing between said valve means and said diaphragm operator.

3. A control valve assembly as claimed in claim 1 wherein said second chamber is defined between said diaphragm operator and said valve means
   said diaphragm operator defining a throughhole between said first and second chamber
   said arm defining a longitudinal through bore and fixedly connected between said valve means first passage and said diaphragm operator through-hole to provide fluid communication between said first passage and said first chamber while sealing communication to said second chamber.

4. A control valve asembly as claimed in claim 1 wherein said biasing means is operable to bias said valve means up to a force of 100 psig fluid pressure source.

5. A control valve assembly as claimed in claim 1 wherein said first chamber is defined in said housing between said valve means and said diaphragm operator.

6. A control valve assembly as claimed in claim 5 wherein said first passage communicates between said third chamber and said first chamber.

7. A control valve assembly as claimed in claim 1, wherein said solenoid operator controls the pressure differential between said first chamber fluid and said third chamber fluid at a pressure differential between zero and five pounds per square inch gage pressure when said valve means blocks fluid flow from said fluid pressure source.

* * * * *